… … …

United States Patent Office 2,744,121
Patented May 1, 1956

2,744,121

PREPARATION OF SUBSTITUTED TETRAHYDROPYRANS

Reginald Harold Hall, Sutton, England, assignor to The Distillers Company Limited, Edinburgh, Scotland, a British company No Drawing. Application July 14, 1951,
Serial No. 236,857

Claims priority, application Great Britain August 1, 1950

13 Claims. (Cl. 260—345.9)

The present invention relates to a process for the preparation of substituted tetrahydropyrans and the resulting products.

The invention comprises the novel products as well as the novel processes and steps of processes according to which such products are manufactured, the specific embodiments of which are described hereinafter by way of example and in accordance with which I now prefer to practise the invention.

Accordingly, the present invention is for a process which comprises reacting a dialdehyde of the formula

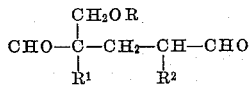

with an alcohol of the formula $R^3OH$ wherein R is a primary hydrocarbon radical, $R^1$ and $R^2$ are selected from the group consisting of methyl and ethyl radicals and $R^3$ is a hydrocarbon radical, in the presence of a catalyst selected from the group consisting of strong acids and acid-activated earths, to produce a substituted tetrahydropyran of the formula:

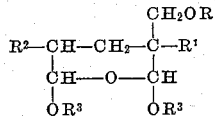

wherein R, $R^1$, $R^2$ and $R^3$ have the significance indicated above. R is suitably a saturated aliphatic radical such as a methyl, ethyl, normal-propyl, normal-butyl, isobutyl or 2-ethylhexyl radical or an unsaturated aliphatc radical such as an allyl radical or a cycloaliphatic radical such as a methylcyclohexyl radical or an aromatic radical such as a benzyl radical. $R^3$ is suitably any of the primary hydrocarbon radicals specified above for R, or a secondary hydrocarbon radical such as an isopropyl radical.

The dialdehyde starting material is most suitably prepared by the treatment of the corresponding alpha-methyl-acrolein or alpha-ethyl-acrolein with the corresponding alcohol, desirably in the presence of a basic catalyst, such as sodium hydroxide, and at a temperature between 0° and 50° C. Where the hydrocarbon radical of the ether group of the dialdehyde starting material is the same as the hydrocarbon radical of the alcohol used in the process of the present invention, the reaction product obtained containing the dialdehyde starting material may be used directly for the process of the present invention, without isolation of said starting material. In this way the substituted tetrahydropyrans according to the present invention may be prepared in a single stage by the treatment of alpha-methyl-acrolein or alpha-ethyl-acrolein with the required alcohol first in the presence of a basic catalyst, followed by neutralisation and subsequent addition of an acidic catalyst. On the other hand, where the hydrocarbon radical of the alkoxy group of the dialdehyde starting material is different from the hydrocarbon radical of the alcohol used in the process of the present invention, the dialdehyde starting material is most suitably isolated from the reaction product containing it before its use in the process of the present invention.

The starting materials employed in the process of the present invention are preferably 2-methoxymethyl-2:4-dimethyl-pentane-1:5-dial and 2-ethoxymethyl-2:4-dimethyl-pentane-1:5-dial. The alcohol employed according to the present invention may be a primary alcohol such as methyl alcohol, ethyl alcohol, normal propyl alcohol, normal butyl alcohol, allyl alcohol, 2-ethylhexyl alcohol, cyclohexyl carbinol and benzyl alcohol or a secondary alcohol such as isopropyl alcohol, secondary butyl alcohol and the like. The catalyst which is employed is suitably hydrogen chloride or a mineral acid such as hydrochloric acid, phosphoric acid or sulphuric acid, or an organic acid such as para-toluene sulphonic acid or an acid activated earth such as fuller's earth.

The acid activated earth catalysts are comparatively mild catalysts for the reaction according to the present invention, and their use necessitates the employment of increased temperatures (compared with mineral acid catalysts) in order that the reaction may proceed to completion. It has been found convenient in some instances to use an acid activated earth catalyst in order to take the reaction to an intermediate stage and thereafter to complete the reaction in the presence of a mineral or organic acid catalyst.

In carrying out the reaction it is preferred to maintain a temperature not substantially in excess of room temperature at least during the admixture of the reactants. The reaction mixture may thereafter be heated and it has been found advantageous to carry out the process of the present invention using substantially anhydrous reactants, and preferably removing the water of reaction as it is formed, suitably by azeotropic distillation.

The products of the present invention are believed to be new compounds and find application as solvents in various fields, and may be substituted for some of the higher boiling organic solvents in their various uses in industry. The substituted tetrahydropyrans have also been found to be valuable froth flotation agents.

The following examples are given to illustrate the process of the present invention. The parts by weight and parts by volume referred to bear the same relation to one another as do grams to millilitres. The reactants and other materials employed are substantially anhydrous unless otherwise indicated.

Example 1

46 parts by volume of ethyl alcohol containing 2.9 parts by weight of hydrogen chloride are added slowly with stirring to a solution of 86 parts by weight of 2-methoxymethyl-2:4-dimethyl-pentane-1:5-dial in 530 parts by volume of ethyl alcohol, whilst cooling the reaction mixture in ice. On completion of the addition of the former reactants, the reaction mixture is allowed to stand at room temperature for several hours, and the product is thereafter made just alkaline with a solution of sodium ethoxide in ethyl alcohol, acidified with acetic acid and distilled. The 2:6-diethoxy-3-methoxymethyl-3:5-dimethyl-tetrahydropyran is obtained as a colourless oil, which on fractionation in vacuo gives 102.3 parts by weight of pure 2:6-diethoxy-3-methoxymethyl-3:5-dimethyl-tetrahydropyran (boiling point 115°–116° C. at 11–12 mm. mercury, refractive index $n_D^{20}$ 1.4359).

Example 2

76 parts by volume of ethyl alcohol containing 2.9 parts by weight of hydrogen chloride are added slowly with stirring to a cooled solution of 86 parts by weight of 2-methoxymethyl-2:4-dimethyl-pentane-1:5-dial in 500 parts by volume of ethyl alcohol, and on completion of this addition the reaction mixture is allowed to stand at room temperature for several hours. 250 parts by volume of benzene and 100 parts by volume of ethyl alcohol are added to the mixture which is then distilled to remove the water present as an azeotrope. The anhydrous product is made just alkaline with a solution of sodium ethoxide in ethyl alcohol, acidified with acetic acid and then distilled. The 2:6-diethoxy-3-methoxymethyl-3:5-dimethyltetrahydropyran is obtained as a colourless oil which, on fraction in vacuo, gives 119.2 parts by weight of pure 2:6-diethoxy-3-methoxymethyl-3:5-dimethyl-tetrahydropyran (boiling point 115–116.5° C. at 10 mm. of mercury, refractive index $n_D^{20}$ 1.4359).

Example 3

55 parts by volume of methyl alcohol containing 0.24 part by weight of hydrogen chloride are added slowly with stirring to a solution of 129 parts by weight of 2-methoxymethyl-2:4-dimethylpentane-1:5-dial in 300 parts by volume of methyl alcohol. On completion of the addition of the latter reactants, the reaction mixture is kept at 0° for some hours, then at room temperature for two days, and the product is thereafter neutralised with a solution of sodium methoxide in methyl alcohol, acidified with a trace of acetic acid, and then distilled, leaving an oil which on distillation in vacuo and subsequent fractionation of the distillate gives 2:6-dimethoxy-3-methoxymethyl-3:5-dimethyl-tetrahydropyran as a colourless oil, in a yield of 141.5 parts by weight (boiling point 101.5–102° C. at 10 mm. mercury, refractive index $n_D^{20}$ 1.4400).

Example 4

140 parts by volume of ethyl alcohol containing 93 parts by weight of 2-ethoxymethyl-2:4-dimethyl-pentane-1:5-dial are added slowly to a stirred, cooled, solution of 0.25 part by weight hydrogen chloride in 150 parts by volume of ethyl alcohol. The mixture is kept for some hours at 0° C., and then allowed to stand overnight at room temperature. 100 parts by volume of ethyl alcohol and 200 parts by volume of benzene are added and the mixture distilled to remove water as the benzene-ethanol-water ternary. When no more water appears in the distillate the contents of the distilling flask are cooled and worked-up as described in Example 1. 110 parts by weight of 2:6-diethoxy-3-ethoxymethyl-3:5-dimethyl-tetrahydropyran are obtained as a colourless liquid (boiling point 120–121° C. at 9.5 mm. mercury, refractive index $n_D^{20}$ 1.4345).

Example 5

74 parts by weight of 2-ethoxymethyl-2:4-dimethyl-pentane-1:5-dial dissolved in 60 parts by volume of methyl alcohol are added slowly, below 0°, to a stirred, cooled solution of 0.17 part by weight of hydrogen chloride in 100 parts by volume of methyl alcohol, the mixture is kept at 0° for some hours and then at room temperature overnight. Isolation of the product as described in Example 1 gives 76 parts by weight of 2:6-dimethoxy-3-ethoxymethyl-3:5-dimethyl-tetrahydropyran as a colourless liquid (boiling point 108–109° C. at 9.5 mm. mercury, refractive index $n_D^{20}$ 1.4387).

Example 6

A solution of 129 parts by weight of 2-methoxymethyl-2:4-dimethyl-pentane-1:5-dial in 400 parts by volume of ethyl alcohol are added slowly to a stirred mixture of 400 parts by volume of ethyl alcohol and 2.4 parts by volume of concentrated sulphuric acid, which is cooled to a temperature below 10° C. After some hours 200 parts by volume of benzene is added thereto and the mixture is distilled through a column fitted with a phase-separating still-head, decanting the lower aqueous layer of the distillate and continuously returning the upper layer to the column as reflux. When water ceases to be removed from the reaction mixture, it is cooled, made alkaline with ethanolic sodium ethoxide solution, acidified with acetic acid and then distilled, finally under reduced pressure, to free the product from inorganic salts. 155 parts by weight of 2:6-diethoxy-3-methoxymethyl-3:5-dimethyl-tetrahydropyran are obtained on fractionation of the distillate (boiling point 118.5° C. at 12.5 mm. mercury, refractive index $n_D^{20}$ 1.4362).

Example 7

43 parts by weight of 2-methoxymethyl-2:4-dimethyl-pentane-1:5-dial is added slowly to a stirred mixture of 185 parts by weight of normal butyl alcohol and 1.85 parts by weight of concentrated sulphuric acid, and the resulting mixture is maintained at 40° C. for 16 hours. At the end of this time, it is made alkaline with a concentrated aqueous solution of sodium hydroxide, acidified with acetic acid and then distilled under reduced pressure to remove inorganic salts. The distillate is subsequently fractionated and yields 53 parts by weight of 2:6-di-normal-butoxy-3-methoxymethyl-3:5-dimethyl-tetrahydropyran as a colourless oil (boiling point 154° C. at 9 mm. mercury, refractive index $n_D^{20}$ 1.4412).

Example 8

280 parts by weight of alpha-methacrolein (97% purity) is added slowly to a stirred, cooled mixture of 800 parts by volume of methyl alcohol and 20 parts by volume of aqueous normal sodium hydroxide solution, maintaining the temperature of the mixture below 20° C. The reaction mixture is kept for some hours at room temperature and is then acidified with a solution of 5 parts by weight of concentrated sulphuric acid in methyl alcohol and is allowed to stand for several days.

10 parts by weight of sodium acetate are added to this mixture, which is stirred for 4 hours and then distilled, finally under reduced pressure, until the boiling point of the distillate rises to 150° C. at 12 mm. mercury. The distillate is fractionated giving 244 parts by weight of pure 2:6-dimethoxy-3-methoxy-methyl-3:5-dimethyl-tetrahydropyran as a colourless liquid (boiling point 103° C. at 11 mm. mercury).

Example 9

43 parts by weight of 2-methoxymethyl-2:4-dimethyl-pentane-1:5-dial is added slowly to a stirred solution of 2 parts by weight of para-toluene sulphonic acid in 200 parts by volume of methyl alcohol and the resulting solution is maintained at room temperature for several days. A solution of 0.5 part by weight of sodium dissolved in methyl alcohol is added to the mixture which is then fractionated, finally under reduced pressure, to give 41.15 parts by weight of 2:6-dimethoxy-3-methoxymethyl-3:5-dimethyl-tetrahydropyran (boiling point 104° C. at 11 mm. mercury).

Example 10

A mixture of 57 parts by weight of 2-methoxymethyl-2:4-dimethyl-pentane-1:5-dial, 107 parts by weight of methyl alcohol and 32 parts by weight of fuller's earth (grade No. 249) is stirred and refluxed gently in a bath kept at 75° C. After a reaction time of 30 hours the mixture is cooled and filtered, the separated fuller's earth washed with methyl alcohol and the combined filtrate and washing then fractionated, finally under reduced pressure, to give 45.7 parts by weight of 6-methoxy-5-methoxymethyl-3:5-dimethyl-delta$^2$-dihydropyran as a colourless liquid (boiling point 78° C. at 9 mm. mercury, refractive index $n_D^{20}$ 1.4488).

18.6 parts by weight of this substituted dihydropyran is reacted with 40 parts by volume of methyl alcohol containing 0.21 part by weight of hydrogen chloride. The product is made alkaline by the addition of 0.2 part by weight of sodium dissolved in 5 parts by volume of methyl alcohol and is fractionally distilled giving 16 parts by weight of 2:6-dimethoxy-3-methoxymethyl-3:5-dimethyl-tetrahydropyran (boiling point 102–104° C. at 11 mm. mercury, $n_D^{20}$ 1.4398).

*Example 11*

43 parts by weight of 2-methoxymethyl-2:4-dimethylpentane-1:5-dial is added slowly to a cooled, stirred solution of 2 parts by volume of concentrated sulphuric acid in 300 parts by weight of isopropyl alcohol. The mixture is maintained at room temperature for 16 hours and then a solution of 2 parts by weight of sodium in isopropyl alcohol is added thereto and the mixture distilled. The distillate obtained is fractionated giving 45.45 parts by weight of 2:6-diisopropoxy-3-methoxymethyl-3:5-dimethyltetrahydropyran as a colourless liquid (boiling point 122–124° C. at 11.5 mm. mercury).

*Example 12*

A mixture of 130 parts by weight of 2-ethylhexanol, 28.7 parts by weight of 2-methoxymethyl-2:4-dimethylpentane-1:5-dial and 13 parts by weight of fuller's earth (grade No. 249) is maintained at 120° C. for 7½ hours. At the end of this time the mixture is cooled and then filtered and the filtrate distilled in vacuo giving 24.15 parts by weight of 2:6-di(2'-ethylhexyloxy)-3-methoxymethyl-3:5-dimethyl-tetrahydropyran as an oil (boiling point 214°–215° C. at 15 mm. mercury, refractive index $n_D^{20}$ 1.4502–1.4510).

I claim:

1. A process which comprises reacting a dialdehyde of the formula:

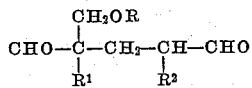

with an alcohol of the formula R³OH where R and R³ are radicals selected from the group consisting of lower alkyl, lower alkenyl, lower cycloalkyl and monocyclic aryl hydrocarbons, and R¹ and R² are alkyl radicals of not more than 2 carbon atoms, in the presence of a catalyst selected from the group consisting of strong acids and acid-activated earths, to produce a substituted tetrahydropyran of the formula:

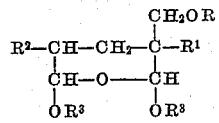

wherein R, R¹, R² and R³ have the significance indicated above.

2. A process as claimed in claim 1, wherein the reactants employed are substantially anhydrous and the water of reaction is removed as it is formed.

3. A process which comprises reacting a dialdehyde of the formula:

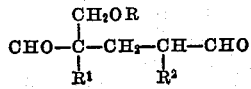

with an alcohol of the formula R³OH, where R and R³ are radicals selected from the group consisting of lower alkyl, lower alkenyl, lower cycloalkyl and monocyclic aryl hydrocarbons, and R¹ and R² are alkyl radicals of not more than 2 carbon atoms, in the presence of an acid activated earth catalyst, subsequently completing the reaction in the presence of a mineral acid catalyst, to produce a substituted tetrahydropyran of the formula:

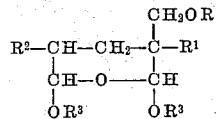

wherein R, R¹, R² and R³ have the significance indicated above.

4. A process as claimed in claim 1, wherein the dialdehyde is 2-methoxymethyl-2:4-dimethylpentane-1:5-dial.

5. A process as claimed in claim 1, wherein the acetalisation catalyst is a mineral acid.

6. Process as claimed in claim 5, wherein the acetalisation catalyst is sulphuric acid.

7. A process as claimed in claim 1, wherein the acetalisation catalyst is hydrogen chloride.

8. Substituted tetrahydropyrans of the formula:

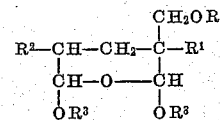

R and R³ are radicals selected from the group consisting of lower alkyl, lower alkenyl, lower cycloalkyl and monocyclic aryl hydrocarbons, and R¹ and R² are alkyl radicals of not more than 2 carbon atoms.

9. 2:6 - dimethoxy - 3 - methoxymethyl - 3:5 - dimethyltetrahydropyran.

10. 2:6 - diethoxy - 3 - methoxymethyl - 3:5 - dimethyltetrahydropyran.

11. 2:6 - diisopropoxy - 3 - methoxymethyl - 3:5 - dimethyltetrahydropyran.

12. 2:6 - di - n - butoxy - 3 - methoxymethyl - 3:5 - dimethyltetrahydropyran.

13. 2:6 - di(2¹ - ethylhexyloxy) - 3 - methoxy - methyl - 3:5-dimethyltetrahydropyran.

References Cited in the file of this patent

UNITED STATES PATENTS

| | | |
|---|---|---|
| 2,513,133 | Hatch et al. | June 27, 1950 |
| 2,556,312 | Young | June 12, 1951 |
| 2,574,919 | Hall et al. | Nov. 13, 1951 |
| 2,591,239 | Dermer et al. | Apr. 1, 1952 |

FOREIGN PATENTS

| | | |
|---|---|---|
| 690,226 | Great Britain | Apr. 15, 1953 |